Patented Oct. 25, 1949

2,485,626

UNITED STATES PATENT OFFICE 2,485,626

CATALYTIC CONVERSION OF HYDROCARBONS

George Alexander Mills, Swarthmore, Pa., assignor to Houdry Process Corporation, Wilmington, Del., a corporation of Delaware No Drawing. Application June 24, 1947,
Serial No. 756,823

8 Claims. (Cl. 196—52)

The present invention relates to the catalytic conversion of hydrocarbons such as fractions obtained or derived from petroleum or other carbonaceous or hydrocarbonaceous materials, and is particularly concerned with such conversion processes in which cracking catalysts can be employed, as for instance in promoting scission of carbon to carbon linkages or in the typical reactions occurring in the reformation with cracking catalysts of liquid products in the boiling range of motor fuel.

Contact masses which produce, when used as catalysts in hydrocarbon cracking processes, only poor yields of gasoline or other desired normally liquid hydrocarbon conversion products, whether because these masses are comparatively inert catalytically or because of their tendency to form large quantities of coke and/or low molecular weight gaseous products at the expense of desired liquid hydrocarbons, although of scientific interest, are not commercially useful or desirable. For economical and efficient operation of most if not all types of hydrocarbon conversion processes, including catalytic reforming as well as catalytic cracking, catalysts of comparatively high activity level are required, which limits the choice to certain expensive synthetic gels for example those comprising silica and alumina, and special types of acid-activated clays.

Certain clays belonging to the montmorillonite group, such as the sub-bentonites, can be activated in known manner by acid treatment to obtain products of enhanced decolorizing properties. This same treatment also develops high catalytic activity. The activation treatment conventionally employed for these purposes involves the use of sulfuric acid in the ratio of about 0.30 acid (100% basis) to the weight of clay (volatile free basis) operating at a temperature of about 200–215° F. over a period of about 6 hours.

Other common and abundant clays, such as kaolin clays, when attempted to be acid activated in the above manner, do not however, result in catalysts of desired activity. These kaolin clays, acid treated in the raw uncalcined state, characteristically demonstrate only a minor increase in catalytic activity, which is not significantly improved by more extensive or more severe acid treatment. The kaolin clays, therefore, cannot be brought to desired higher activity level by the conventional methods of acid treatment used in preparing acid-activated montmorillonite clays.

It has now been discovered, however, that by a special activation treatment hereinafter described kaolin clays can be brought to desired higher levels of catalytic activity and catalysts of improved value for use in hydrocarbon conversion thereby prepared. It is thus made possible in accordance with the present invention to prepare by relatively inexpensive procedure from these otherwise comparatively inactive kaolin clays, catalysts coming within the high activity level of the known acid-activated montmorillonite clays, while retaining certain advantages of the kaolins particularly incident to their higher density and higher heat stability. The novel active catalysts are prepared by subjecting a kaolin clay to calcination at certain elevated temperatures followed by acid treatment under especially selected conditions. The kaolin clay initially subjected to such calcination may be a raw clay or an acid-treated or chemically modified clay.

It is generally known to the art that the acid solubility of the alumina contained in kaolin clays is considerably increased by calcination of the clay previous to acid treatment and accordingly this procedure has been advocated in extracting large quantities of aluminum from these clays in the preparation of solutions rich in aluminum salts. The solid residues resulting from such procedures, however, have not been found to possess any enhanced catalytic activity. In accordance with the present invention however, catalysts of enhanced activity are obtained from kaolin clays by subjecting the clay to calcination within a selected temperature range and after cooling to required temperature, acid leaching the cooled clay under relatively mild conditions, but nevertheless so controlled that removal of a portion of the alumina content is effected, advantageously to the extent of at least 10% by weight of the original alumina content of the clay. The mild conditions of the acid treatment must be such as to effect uniformity of treatment and leave the clay in satisfactory physical condition particularly with regard to the physical strength of the individual clay particles (non-friability). Properly treated kaolin clays in accordance with the invention have in pelleted form a high bulk density, in most instances above 0.75 kg./lit. and usually as high as 0.9 or above, and an excellent hardness in that form, being generally above 5000 grams, measured by the knife edge test hereinafter described.

As in the case of montmorillonite type clays, not all of which have been found to be acid-activatable, so with kaolin clays not all of these respond equally to the treatment of the invention to produce catalysts of equally enhanced activity, but significant increase of activity over that of the raw clay is characteristically obtained.

In the practice of the invention the clay, in either ground or particulated or artifically formed physical shape, is preferably calcined as the preliminary step in the treatment. The conditions of the calcination step include temperatures of 800° F. and upward as to 1700° F. or to such a temperature short of that at which the clay tends to shrink rapidly or becomes permanently impaired; a minimum time such that the temperature of the entire mass being treated is allowed to reach the temperature of treatment and a reasonable time thereafter to insure that the desired effect is achieved; about 2 hours treatment has been found convenient in practice.

In general, the most satisfactory temperature and conditions of calcination for optimum effect, are subject to adjustment in view of the nature of the clay undergoing the treatment, the type of atmosphere present during the treatment and the particular catalytic properties desired in the final catalyst. For instance when the calcination treatment is effected in an atmosphere of steam, activation to highest levels of activity may take place at a different, usually lower, temperature than that obtaining in the case of dry air. With different kaolin clays the best temperature within the described range for obtaining maximum activity may vary, so that in individual instances the preferred calcination temperature employed in practice of the invention may be at the lowest, the highest, or at some intermediate temperature levels within the described range; or in some instances substantially equivalent results may be obtained at the lower and upper temperature levels with unexplained less satisfactory results at certain intermediate levels. It has also been observed that in some kaolin clays a portion of the minor constituents present, such as oxides of iron or other metals, become highly activated at the higher temperatures within the described range, which may modify the desired catalytic properties particularly the selectivity of the catalyst. It therefore may be found advisable in these cases, in order to prepare catalysts of highest activity and desired selectivity, to resort to lower calcination temperatures within the described range, or to take precautions that these undesired active materials are deactivated or removed, as by prolonging the extent of the subsequent acid leaching or by supplementing the acid leaching by a treatment with selective solvents for these metal oxides.

If the catalyst is intended for use in the form of tablets, pellets, or other more or less regular agglomerated masses, it is preferred to carry out the described calcination on the clay which has already been prepared or shaped in the desired form, which form will be retained when the calcined clay is subsequently subjected to the described acid treatment. If the clay is calcined while in the form of finely divided particles, the loss of plasticity effected by calcination may prevent subsequent agglomeration as by molding or extrusion and necessitate the introduction of additional binding agents if such agglomerated masses are desired.

The designated acid treatment is performed on the clay product after it has cooled down from its previous calcination temperature to the required acid treating temperature. For the acid treatment, room temperatures may be conveniently employed including temperatures up to about 110° F. In many instances optimum degree of activation may be obtained at these temperatures in about 24 hours, although acid treatment in a shorter time as about 8 to 12 hours obtains substantial enhancement of activity with progressively improved activity as the duration of the treatment is increased up to and beyond 24 hours as to about 36 hours and in some instances longer as up to about 72 hours or more.

As a general rule, except when it is desired to remove unwanted metal oxides as heretofore indicated, the extension of the acid treatment beyond the indicated 36 to 72 hours is not advocated, since in many instances the degree of increased activation thereby obtained may be negligible, or at least the activating effect of the acid treatment becomes so progressively diminished that it offers no practical advantage.

Contrary to the effect of acid treatment of uncalcined raw kaolin clays where the peak of activation is reached with practically no alumina removal (less than 1%) and subsequent tendency to decrease in activity as more alumina is removed, the activity of the catalysts prepared in accordance with the invention continues to increase beyond the peak otherwise reached, as alumina in amounts of up to and sometimes over 50% of the alumina present in the raw clay is removed during the acid treatment. When the extent and severity of the acid treatment is such that less than 5% of the dry weight of the clay is removed, which for kaolins generally corresponds to about 10% of the alumina originally present in the clay, the activity of the finished catalyst is not as high as may be desired and it is therefore preferred to remove larger percentages of the alumina in order that the full benefits of this invention may be obtained. In the practice of the process approximately the optimum level of activity is reached or approached before 50% of the alumina has been removed, so that no practical advantage has been observed for removing more than this amount.

In the practice of this invention it is necessary to moderate the acid treatment to the extent of retaining substantially the features of high density, uniformity of treatment, and physical strength, while controlling the conditions and extent of the treatment so as to remove the required amount of alumina. This control is obtained by using relatively dilute mineral acid such as 10 to 20% HCl or 15 to 25% $H_2SO_4$ or similarly acting acids, by effecting the treatment preferably at room temperatures or somewhat above as at about 70° to 110° F., and by treating for the time required as indicated above. The quantity of diluted acid employed should be at least sufficient in volume to cover the clay and be capable of dissolving the quantity of alumina required to be removed from the clay. Beyond this, the quantity of total acid employed is not qualitatively important, but it will be understood that as far as consistent with economics of operation, larger quantities of acid and particularly more frequent changes of acid are beneficial because these will tend to speed up the leaching process.

It might have been expected that acid treatment with more concentrated acid and at higher temperatures than those set out above would enhance the leaching operation, but it was found on the contrary that under these conditions the desired physical properties of the clay may be impaired and that the treated products as a rule cannot be brought up to the highest catalytic activity obtained by the cooler acid treatment. This may be due to the fact that at the higher temperatures the reaction of the acid with the alumina is accelerated to a rate beyond the rate of diffusion of the acid into the interior of the clay, so that the clay particles, granules, or pellets are not uniformly treated throughout. To a lesser extent highly concentrated acids either because of the increased reaction rate or the accompanying elevation of temperature may also interfere with uniformity of treatment, so that if these highly concentrated acids are employed external cooling may be required. Accordingly it is preferred to use the less concentrated acids and the mild temperatures indicated.

If long periods of acid treatment as up to 72 hours are not favored because of operational and equipmental limitations, relatively successful catalysts may be prepared by first subjecting the calcined material to the described mild acid treatment for a relatively short time such as 2 to 8 hours, and thereafter to an acid treatment of increasing or increased severity such as that obtained by more concentrated acids and particularly higher temperatures of up to 175° F. Although more efficient removal of alumina is obtained by the use of mineral acid, in some instances this treatment may be beneficially supplemented by such organic acids as form soluble metal complexes or by the stronger of the organic acids or salts thereof. For instance the calcined clay may be treated with an organic acid such as oxalic acid or with a salt such as ammonium oxalate, before or after the clay is subjected to mineral acid leaching to remove the required amount of alumina, with concomitant maintenance of density, hardness and the like.

Following acid treatment the clay should be washed to remove adhering acid as well as water soluble materials dissolved from the clay by the acid. The washing is readily performed because of the dense and hard condition of the clay as a result of the previous calcination, whether the clay being washed is in the form of shaped or otherwise agglomerated masses or more finely divided particles. Following washing, the clay may be dried in any convenient manner.

The thus prepared clay may now be preconditioned for use as a catalyst in a hydrocarbon conversion operation and its activity finally stabilized by treatment at elevated temperature with hot air or steam or mixtures of these; or the clay without such stabilizing heat treatment may be charged directly in a hydrocarbon conversion system, where it will be eventually conditioned to stable activity level as a result of the temperatures encountered in use and in regeneration.

The term "activity," as employed in the present specification and claims has reference to the relative quantity of gasoline obtained on cracking of hydrocarbon charge stock, as measured by the Cat-A method, described by H. G. Shimp and J. A. Alexander in National Petroleum News, Technical Section, August 2, 1944. In accordance with that method a light East Texas gas oil is contacted with the catalyst at a temperature of approximately 800° F. under atmospheric pressure and at a liquid space rate of 1.5 (volume charge/volume of catalyst/per hour), for a ten minute operation period. The volume of gasoline of 410° F. cut point is measured and expressed as a percentage of the volume of oil charged, thereby designating the characteristic activity of the catalyst. The quantity of carbonaceous deposit formed in the catalyst is also measured and expressed in terms of weight percent of charge. The weight per cent of gas and its specific gravity is also determined in this test.

The term "bulk density" as herein employed has reference to weight per unit volume (kg./lit.) occupied by the material, measured in the form of extruded cylindrical pellets of 4 mm. diameter and 4 mm. length with standard random packing. The reference to "knife edge hardness" denotes the ability of the pelleted material to resist breakage as measured by applying a weighted knife edge (such as is used in weight balances) to the center of the pellet perpendicular to the axis.

The terms "kaolin" or "kaolin clay" as herein employed include those clays which in the raw state contain as the principal clay mineral constituent present therein, kaolinite, halloysite, indiananite, dickite, nacrite or anauxite. These clay minerals are all hydrous aluminum silicates in their uncalcined form and may be represented by the formula $Al_2O_3.2SiO_2.nH_2O$, $n$ being generally 2. The indicated formula gives a weight ratio of $SiO_2/Al_2O_3$ of about 1.16 and the various naturally occurring clays of the invention generally fall within a $SiO_2/Al_2O_3$ ratio of about 1.0 to about 1.5.

EXAMPLE I

The clay treated in this example was a kaolin clay from the Eccles property, Putnam County, Florida, which had the following analysis by weight on an ignited basis (containing about 10-20% unremoved sand):

| | Weight percent |
|---|---|
| $SiO_2$ | 65.3 |
| $Al_2O_3$ | 32.4 |
| $Fe_2O_3$ | 1.4 |
| $CaO$ | 0.23 |
| $MgO$ | .21 |
| $TiO_2$ | .69 | a. This clay had an activity by the "Cat-A" method, pelleted in the raw state and then calcined at 1050° F. for 2 hours, of about 25% gasoline.

b. The same kaolin clay treated in raw uncalcined state with dilute sulfuric acid (20 to 30% concentration) under various conditions including temperatures of about 194° to about 200° F., for 4 to 22 hours, with ratios of .40 to 1.00 parts of acid (100%) to weight of clay (dry basis), followed by the same final calcination as above, on test by the Cat-A method gave yields of from about 20 to 29% gasoline.

c. The same clay was pelleted in the raw state and then calcined at 1050° F. in dry air for 2 hours, followed by a mild acid treatment in accordance with the invention, employing aqueous hydrochloric acid of 15% concentration at room temperature (in the ratio of 0.4 part of 100% acid to dry clay weight) over a period of 24 hours. Following washing and drying the pellets were given a final stabilizing calcination at 1050° F. for 2 hours. The activity of catalysts thus prepared was raised to 35-36% gasoline.

d. By air calcination of the same raw kaolin clay at 1500° F. for 2 hours followed by mild acid treatment at room temperature for 72 hours, catalysts of about 39 to 40 gasoline activity were obtained in each instance, using either 20% $H_2SO_4$ or 15% HCl.

e. Using comparatively low calcination temperatures, of about 800° F. preceding the same 72 hour hydrochloric acid treatment, obtained catalyst having about 31% gasoline activity. When the calcination temperature was increased to 1600° F. and the same 72 hour room temperature hydrochloric acid leach employed, the obtained catalyst showed an activity of approximately 37% gasoline.

Each of the catalysts prepared above by calcination and mild acid treatment had, after final calcination, a bulk density falling within the range of 0.8 to 0.94 and a knife edge hardness in the range of 6200 to almost 12,000 grams.

EXAMPLE II

The effect of varying the duration of the acid treatment but otherwise maintaining substantially constant treating conditions is shown by the following table. The results are based on the Eccles kaolin of Example I calcined at 1500° F. in air for 2 hours followed by room temperature acid leaching with 15% HCl for the time indicated.

*Table I*

| Duration of Acid Leach, Hours | $Al_2O_3$ Dissolved from Clay gm./100 gm. (Dry) | Cat-A Activity Vol. Percent Gasoline | Bulk Density Kg./Lit. | K. E. Hardness, Grams |
|---|---|---|---|---|
| 2 | 3.22 | 32.8 | .960 | 7,200 |
| 4 | 4.77 | 33.8 | .956 | 7,800 |
| 6 | 4.95 | 34.4 | .944 | 8,300 |
| 8 | 6.66 | 36.5 | .936 | 7,900 |
| 14 | 7.15 | 36.8 | .928 | 7,900 |
| 24 | 11.15 | 40.4 | .904 | 8,300 |
| 48 | 14.00 | 40.7 | .864 | 12,400 |
| 72 | 12.85 | 40.9 | .868 | 7,900 |

It will be seen from the foregoing table that for this clay under the conditions employed, no appreciable gain in activity of the catalyst was obtained by extending the acid leaching beyond 24 hours.

EXAMPLE III

In another series of experiments, the kaolin clay employed was from the Edgar clay mines in Putnam County, Florida, known commercially as "Edgar EPK" and having the following analysis on a dry (105° C.) basis:

| | Weight percent |
|---|---|
| Ign. loss | 12.9 |
| Si as $SiO_2$ | 46.6 |
| Al as $Al_2O_3$ | 38.8 |
| Fe as $Fe_2O_3$ | 1.0 |
| Ca as CaO | 0.44 |
| Mg as MgO | 0.23 |
| Na as $Na_2O$ | 0.52 |
| Ti as $TiO_2$ | 0.35 |

(Approx. 0.3% quartz)

(a) This kaolin clay in the raw state has an activity by the Cat-A method of about 10–15% gasoline after calcination at 1050° F. for 2 hours.

(b) However by leaching the above calcined clay with 15% HCl for 24 hours at about room temperature the activity was raised to about 29% gasoline (tested after final stabilizing calcination at 1050° F. for 2 hours). Catalysts giving about the same gasoline yields (about 28%) were also obtained by calcining the clay at 800° F. and at 1000° F. followed by 72 hour leaching with 15% HCl at room temperature.

(c) By calcination at 1600° F. in air and acid leaching at room temperature with 15% HCl for 72 hours, catalyst of about 27% gasoline activity was obtained.

The pelleted catalyst produced under (b) and (c) above maintained an apparent density between 0.9 and 0.95 (kg./lit.) and in each instance showed a hardness by the knife edge test in excess of 8500 grams.

EXAMPLE IV

In the following experiment the kaolin treated was one of high alumina content obtained from Huron County, Indiana, having the following analysis on a dry (105° C.) basis:

| | Weight percent |
|---|---|
| Ignition loss | 14.9 |
| Si as $SiO_2$ | 43.8 |
| Al as $Al_2O_3$ | 40.3 |
| Fe as $Fe_2O_3$ | 0.95 |
| Ca as CaO | .01 |
| Mg as MgO | .17 |
| Na as $Na_2O$ | .09 |
| Ti as $TiO_2$ | .16 |
| K as $K_2O$ | .36 |

This kaolin clay, when calcined in air at 1050° F. for 2 hours, shows a Cat-A activity of less than 15% gasoline. The same clay similarly calcined and then acid leached with 15% HCl for 24 hours at room temperature was brought to an activity of 36.7% gasoline; when the leaching time was increased to 72 hours the activity of the clay was brought to 38% gasoline.

By carrying out the calcination at 1500° F. and the same mild acid leaching as before, catalysts having an activity of 30 to 31% gasoline were obtained with 24 or 72 hours acid leaching.

The apparent density of the pelleted catalyst in each instance above was between 0.76 and 0.8 kg./lit. and the hardness of the pellets was satisfactory, being from 5200 to 6600 grams.

EXAMPLE V

In this example the kaolin clay treated was Putman Kaolin obtained from the United Clay Mines in Putman County, Florida. This clay showed an activity by the Cat-A method of less than 15% gasoline after calcination at 1050° F. in air for 2 hours, and has the following typical analysis on a dry basis:

| | Weight percent |
|---|---|
| Ign. Loss | 14.15 |
| Si as $SiO_2$ | 46.4 |
| Al as $Al_2O_3$ | 38.6 |
| Fe as $Fe_2O_3$ | 0.38 |
| Ca as CaO | Tr. |
| Mg as MgO | 0.19 |
| Na as $Na_2O$ | 0.43 |
| K as $K_2O$ | 0.35 |
| Ti as $TiO_2$ | 0.24 |

The above calcined clay or one calcined for 2 hours at 1500° F. and then leached in each case for 72 hours with 15% HCl at room temperature showed activity in the range of 27–29% gasoline.

By reducing the leaching time to 24 hours in each of the above given instances, the activity of the catalyst thus prepared was 22–23% gasoline.

The bulk density of the pelleted clay in all instances was in the range of 0.78 to 0.86 kg./lit., but the hardness was below that of the other clays tested (knife edge hardness below 4000 grams).

EXAMPLE VI

The clay treated in this example was a halloysite clay obtained from the vicinity of Eureka, Utah having substantially the following composition (105° C. dry basis)

| | Weight percent |
|---|---|
| Ign. loss | ---- |
| Si as $SiO_2$ | 42.9 |
| Al as $Al_2O_3$ | 43.2 |
| Fe as $FeO_3$ | 0.30 |
| Na as $Na_2O$ | 0.05 |
| Ca as CaO | 0.13 |
| Mg as MgO | 0.08 |
| K as $K_2O$ | 0.09 |

This clay has an activity in the raw state (after calcination of the pelleted clay at 1050° F. for 2 hours) of about 30% gasoline by the Cat-A method. By acid treatment of the raw clay (uncalcined) no significant increase in catalytic activity was obtained.

(a) When, however, the calcination (1050° F. in air for 2 hours) of the pelleted clay was followed by acid leaching with 15% HCl for 24 and 72 hours respectively, catalysts having activities of 38 to over 40% gasoline were obtained. The catalysts as above prepared have bulk densities on the average of about 0.85 kg./liter and a knife edge hardness over 5000 and up to 10,000 grams.

Instead of carrying out the calcination in air, vacuum or any suitable substantially inert atmosphere may be employed, such as nitrogen, or steam, or the latter may be used in admixture with air or other inert gas. In many instances lower temperatures of treatment are found effective with steam than with dry air to obtain maximum effect. For instance by treating the raw clay of Example I with 100% steam at 1350° F. for four hours and then acid leaching with 15% HCl for 72 hours catalysts having activities of over 40% gasoline were obtained (tested after final calcination at 1050° F. in air for 2 hours). Likewise the kaolin of Example III was brought to an activity of over 37% gasoline by similar steam and acid treatment. The density (above 0.9) and hardness (above 9500 grams) were quite satisfactory in each instance.

In the use of the catalysts according to the present invention no change in usual conditions of treatment of the hydrocarbon to be processed is rendered necessary. The usual conditions as to time, temperature, etc. can be followed if desired. As an example of a fixed bed operation, cracking may be carried out at a temperature of 800° F to 900° F., employing a space rate (volume of charge, liquid basis, per volume of catalyst per hour) of about 1.5, and a pressure of about 15 pounds per square inch gauge. The temperature, of course, may be varied within the range of about 700° F. to 1100° F., the space rate within the range of about 0.5 to about 8, and pressures may be employed from about atmospheric or slightly lower up to about 100 pounds per square inch, or even higher. Under these conditions the operating period "on stream" may range from five to sixty minutes, for example 10 to 30 minutes alternating with regeneration periods.

In processes other than the fixed bed, such as where the catalyst moves through the reaction zone, the conditions employed may be such, as to subject the oil to substantially equivalent conditions including contact time and ratios of oil to catalyst as those set out above in connection with the fixed bed process. The catalyst during its cycle is passed through a separate regeneration zone.

Reforming may be carried out in accordance with the invention by charging a virgin or cracked gasoline or naphtha fraction under conditions similar to those employed in cracking. In all of these processes, the catalyst after use is regenerated by contacting it with air or other oxygen-containing gas to burn off carbonaceous deposits.

Catalysts with which the invention is concerned also find use in synthesis reactions, for example, polymerization of gaseous hydrocarbons to liquid products.

I claim as my invention:

1. In methods comprising catalytic conversion of hydrocarbons in contact with a cracking catalyst, the improvement which comprises contacting said hydrocarbons under catalytic cracking conditions with a catalyst comprising a kaolin clay which has been activated by calcination at temperatures not less than 800° F. followed by leaching with acid under conditions such that at least 10% by weight of the alumina content of the clay is removed therefrom.

2. The method of converting hydrocarbons of higher boiling point into products boiling in the range of gasoline which comprises contacting under catalytic cracking conditions a charge stock containing such higher boiling hydrocarbons, with a catalyst comprising a kaolin clay which has been activated by calcination at temperatures in the range of 800° to 1700° F. in an inert atmosphere followed by mild treatment with mineral acid, whereby at least 10% by weight of the alumina content of the clay is removed therefrom.

3. The method of cracking hydrocarbon oils for the production of gasoline which comprises subjecting such hydrocarbon oils to contact under catalytic cracking conditions with a catalyst comprising a pelleted kaolin clay which has been calcined at temperatures in the range of 800° to 1700° F. and then leached at approximately room temperature with dilute mineral acid.

4. The process of claim 3 wherein said kaolin clay is leached with aqueous hydrochloric acid of 15% concentration for not less than 24 hours.

5. The process of claim 3 wherein said calcination is effected in dry air at no less than 1050° F.

6. The method of producing from normally liquid hydrocarbons gasoline of improved motor fuel value which comprises subjecting such hydrocarbons to contact under catalytic cracking conditions with a pelleted catalyst comprising activated kaolin clay, said pellets having a bulk density above 0.75 kg./lit. and having a hardness above 5,000 grams by the knife edge test, said kaolin clay having been activated by calcination and acid leaching under conditions effecting removal of at least 10% by weight of the alumina content of the clay.

7. The method of claim 6 wherein said catalyst has an activity of at least 35% gasoline as measured by the Cat-A method.

8. The process of claim 6 wherein said calcination is effected in the presence of steam at about 1350° F.

GEORGE ALEXANDER MILLS.

REFERENCES CITED

The following references are of record in the file of this patent:

UNITED STATES PATENTS

| Number | Name | Date |
|---|---|---|
| 1,159,450 | Welsh | Nov. 9, 1915 |
| 1,858,100 | McAdoo | May 10, 1932 |
| 2,374,313 | Veltman | Apr. 24, 1945 |